US012811119B2

(12) United States Patent
Yamaguchi

(10) Patent No.: US 12,811,119 B2
(45) Date of Patent: Nov. 24, 2026

(54) MASS SPECTROMETRY DATA ANALYSIS METHOD AND IMAGING MASS SPECTROMETER

(71) Applicant: SHIMADZU CORPORATION, Kyoto (JP)

(72) Inventor: Shinichi Yamaguchi, Kyoto (JP)

(73) Assignee: SHIMADZU CORPORATION, Nishinokyo (JP)

( * ) Notice: Subject to any disclaimer, the term of this patent is extended or adjusted under 35 U.S.C. 154(b) by 330 days.

(21) Appl. No.: 18/691,405

(22) PCT Filed: Oct. 8, 2021

(86) PCT No.: PCT/JP2021/037385

§ 371 (c)(1),
(2) Date: Mar. 12, 2024

(87) PCT Pub. No.: WO2023/058234

PCT Pub. Date: Apr. 13, 2023

(65) Prior Publication Data

US 2024/0387158 A1 Nov. 21, 2024

(51) Int. Cl.
*H01J 49/00* (2006.01)

(52) U.S. Cl.
CPC ...... *H01J 49/0036* (2013.01); *H01J 49/0004* (2013.01)

(58) Field of Classification Search
CPC ... H01J 49/0036; H01J 49/0004; G01N 27/62
See application file for complete search history.

(56) References Cited

U.S. PATENT DOCUMENTS 10,312,067 B2 * 6/2019 Ikegami .............. H01J 49/0036
2001/0027382 A1 * 10/2001 Jarman .............. H01J 49/0036 702/179

(Continued)

FOREIGN PATENT DOCUMENTS

JP 2011-191222 A 9/2011
WO 2015/053039 A1 4/2015

OTHER PUBLICATIONS

Alexandrov, T., & Kobarg, J. H. (2011). Efficient spatial segmentation of large imaging mass spectrometry datasets with spatially aware clustering. Bioinformatics, 27(13), i230-i238. https://doi.org/10.1093/bioinformatics/btr246 (Year: 2011).*

(Continued)

*Primary Examiner* — Wyatt A Stoffa
*Assistant Examiner* — Larry Li
(74) *Attorney, Agent, or Firm* — Muir Patent Law, PLLC

(57) ABSTRACT

An imaging mass spectrometer includes: a measurement unit to acquire data by performing mass spectrometry for each micro region in a measurement region; an analysis region determination unit to determine analysis regions each including the micro regions by dividing the measurement region or in accordance with user designation; a spectrum operation unit to acquire, in each analysis region, an individual integrated mass spectrum by averaging or summing profile spectra based on data obtained by the measurement unit; a peak information integration unit to detect a peak on each individual integrated mass spectrum, to collect peak information including at least an m/z value of the peak, to gather peak information, to integrate peaks that can be estimated to have substantially the same m/z value to obtain integrated peak information; and a display processing unit to create a peak list or a mass spectrum.

4 Claims, 4 Drawing Sheets

(56) References Cited

U.S. PATENT DOCUMENTS

| | | | | |
|---|---|---|---|---|
| 2007/0141719 | A1* | 6/2007 | Bui | H01J 49/164 436/173 |
| 2010/0108876 | A1* | 5/2010 | Hom | H01J 49/0036 250/281 |
| 2011/0228970 | A1* | 9/2011 | Kajihara | H01J 49/0004 382/100 |
| 2012/0278037 | A1* | 11/2012 | Matsuura | G06F 15/00 702/173 |
| 2012/0303288 | A1* | 11/2012 | Morinaga | G16B 40/00 702/23 |
| 2016/0049282 | A1* | 2/2016 | Brown | H01J 49/164 250/281 |
| 2016/0071711 | A1* | 3/2016 | Ikegami | H01J 49/0036 250/281 |
| 2017/0221687 | A1* | 8/2017 | Stauber | G06V 10/42 |
| 2019/0198302 | A1* | 6/2019 | Deininger | H01J 49/0036 |
| 2020/0057049 | A1* | 2/2020 | Alexandrov | H01J 49/164 |
| 2022/0336058 | A1* | 10/2022 | Merchant | G01N 33/5759 |
| 2023/0154740 | A1* | 5/2023 | Jones | H01J 49/0004 250/288 |

OTHER PUBLICATIONS

Written Opinion of the International Searching Authority (ISA237) dated Nov. 30, 2021, for PCT application No. PCT/JP2021/037385.

* cited by examiner

MASS SPECTROMETRY DATA ANALYSIS METHOD AND IMAGING MASS SPECTROMETER

TECHNICAL FIELD

The present invention relates to an imaging mass spectrometer and a method for analyzing data collected by the imaging mass spectrometer.

BACKGROUND ART

An imaging mass spectrometer is a device capable of visualizing a compound distribution on a sample such as a section of biological tissue. An imaging mass spectrometer disclosed in Patent Literature 1 is equipped with an ion source by a matrix assisted laser desorption/ionization (MALDI) method. The imaging mass spectrometer collects mass spectrum data over a predetermined mass-to-charge ratio (customarily referred to as "mass-to-charge ratio" or simply referred to as "m/z" in this specification) range for each micro region obtained by finely segmenting a two-dimensional measurement region on a sample.

As another method of imaging mass spectrometry, there is also known a method of acquiring mass spectrum data for each micro region by cutting out a sample piece from each micro region in a measurement region by use of a sampling method called laser microdissection, and providing a mass spectrometer with a liquid sample prepared from each sample piece (see Patent Literature 2). Here, the imaging mass spectrometer also includes a device using such a sampling method.

In any case, the imaging mass spectrometer can obtain an image showing a distribution of a specific compound by extracting, for example, a signal intensity value at an m/z value of an ion derived from the specific compound, from mass spectrum data obtained for each micro region on a sample, and creating an image in which the signal intensity value is disposed according to a two-dimensional position of each micro region on the sample. Hereinafter, such an image is referred to as mass spectrometry (MS) image.

In a typical imaging mass spectrometer, in a case in which a compound to be observed, that is, a target compound is already determined, a user specifies an m/z value corresponding to the compound. Then, an MS image at the m/z value is created and displayed on a screen of a display unit.

On the other hand, in a case in which the target compound is not specified, a user designates an appropriate mass peak while viewing an acquired mass spectrum. Then, the imaging mass spectrometer creates an MS image corresponding to the m/z value of the designated mass peak, and displays the MS image on the screen of the display unit.

In such a case, as described in Patent Literature 1, an average mass spectrum created by averaging a plurality of mass spectra obtained in all micro regions in a measurement region or a summed mass spectrum obtained by simply summing the plurality of mass spectra is often used as the mass spectrum for a user to select a mass peak. This is because it is considered that information of all the compounds existing in the measurement region is generally reflected in the average mass spectrum or the summed mass spectrum (the average mass spectrum and the summed mass spectrum are substantially the same, and thus only the average mass spectrum will be described below, but the same applies to the summed mass spectrum).

CITATION LIST

Patent Literature

Patent Literature 1: JP 2011-191222 A
Patent Literature 2: WO 2015/053039 A

SUMMARY OF INVENTION

Technical Problem

However, the above analysis method in the conventional imaging mass spectrometer has the following problems.

The above average mass spectrum is obtained by averaging so-called profile spectra created based on raw data obtained by mass spectrometry on all the micro regions in the measurement region. The width of a mass peak observed in a profile spectrum depends on the mass resolution of the mass spectrometer used for measurement.

In a time-of-flight mass spectrometer (TOFMS) generally used in an imaging mass spectrometer, the skirt of a mass peak appearing in a profile spectrum may be broad although mass resolution is generally relatively high. In such a case, if the difference in m/z value between the mass peak observed in a relatively wide region in the measurement region and the mass peak locally observed in a narrow region in the measurement region is small and the signal intensity of the latter mass peak is significantly smaller than the signal intensity of the former mass peak, there is a possibility that the mass peak having a smaller signal intensity is buried at the skirt of the mass peak having a larger signal intensity when the mass spectra are averaged or summed. In such a case, a locally observed mass peak does not appear in the average mass spectrum, and as a result, a user may overlook an important compound that is locally distributed in the measurement region.

In addition, with mass resolution of general TOFMS, mass peaks derived from different compounds having significantly close masses may not be adequately separated from each other. When an average mass spectrum is created from a plurality of profile spectra with such inadequate separation, mass peaks in which m/z values are close to each other often overlap and become almost one mass peak. An m/z value obtained from such a mass peak may be different from the m/z value corresponding to any of the plurality of overlapping compounds.

As described above, it is often seen that a mass peak derived from a compound locally contained in a trace amount on the sample cannot be observed in the average mass spectrum. In addition, an m/z value of a mass peak observed in the average mass spectrum often deviates from an m/z value corresponding to a compound actually contained in the sample. For this reason, when a mass peak observed in the average mass spectrum is selected and an MS image at the specific m/z value corresponding to the mass peak is displayed, the distribution of the compound that should be observed by the user may be inaccurate.

The present invention has been made to solve such problems, and an object of the present invention is to provide a mass spectrometry data analysis method and an imaging mass spectrometer capable of reliably grasping even a relatively small amount of a compound locally present in a measurement region without overlooking the presence, and to observe a proper MS image.

Another object of the present invention is to provide a mass spectrometry data analysis method and an imaging mass spectrometer capable of displaying an MS image of an m/z value accurately corresponding to a compound present in a measurement region.

Solution to Problem

One mode of a mass spectrometry data analysis method according to the present invention made to solve the above problems is a mass spectrometry data analysis method for analyzing data obtained by performing mass spectrometry for each of a plurality of micro regions in a measurement region on a sample, the mass spectrometry data analysis method including:

an analysis region determination step of determining a plurality of analysis regions each including a plurality of the micro regions by dividing the measurement region or in accordance with designation of a user for an inside of the measurement region;

a spectrum operation step of acquiring, in each of the plurality of analysis regions, an individual integrated mass spectrum by averaging or summing profile spectra for micro regions based on data obtained for a plurality of micro regions included in the analysis region;

a peak information integration step of detecting a peak on each of a plurality of the individual integrated mass spectra, collecting peak information including at least a mass-to-charge ratio value of the peak detected in each of the plurality of analysis regions, gathering peak information of the plurality of analysis regions, integrating peaks that can be estimated to have substantially the same mass-to-charge ratio value, and obtaining integrated peak information; and an information display step of creating and displaying a peak list or a mass spectrum based on the integrated peak information.

In addition, one mode of an imaging mass spectrometer according to the present invention made to solve the above problems is an imaging mass spectrometer including:

a measurement unit configured to acquire data by performing mass spectrometry for each of a plurality of micro regions in a measurement region on a sample;

an analysis region determination unit configured to determine a plurality of analysis regions each including a plurality of the micro regions by dividing the measurement region or in accordance with designation of a user for an inside of the measurement region;

a spectrum operation unit configured to acquire, in each of the plurality of analysis regions, an individual integrated mass spectrum by averaging or summing profile spectra based on data obtained by the measurement unit for a plurality of micro regions included in the analysis region;

a peak information integration unit configured to detect a peak on each of a plurality of the individual integrated mass spectra, to collect peak information including at least a mass-to-charge ratio value of the peak detected in each of the plurality of analysis regions, to gather peak information of the plurality of analysis regions, to integrate peaks that can be estimated to have substantially the same mass-to-charge ratio value, and to obtain integrated peak information; and a display processing unit configured to create a peak list or a mass spectrum based on the integrated peak information and display it on a display unit.

Advantageous Effects of Invention

In the above mode of the present invention, the profile spectrum is averaged (or summed) not for the entire measurement region where the data is collected but for each analysis region having an area smaller than the entire measurement region, and the integrated peak information is obtained based on the result. Therefore, it is possible to prevent a peak derived from a compound locally present in a relatively small amount in the measurement region from being buried in the skirt of another peak having a close m/z value and high intensity, and it is possible to provide a peak list or a mass spectrum accurately reflecting such a peak to the user. Therefore, according to the above modes of the present invention, the user can accurately analyze the target compound without overlooking the presence of the compound that is locally present in a small amount in a narrow area of the measurement region.

In addition, according to the above modes of the present invention, it is possible to display a mass spectrum in which peaks having m/z values highly accurately corresponding to masses of a plurality of compounds present in the measurement region are observed while utilizing high mass accuracy of a mass spectrometer used for measurement. Thereby, the user can observe an MS image with high accuracy corresponding to each of the plurality of compounds, and can perform distribution analysis of the compound with finer and higher accuracy than before.

DESCRIPTION OF EMBODIMENTS

Hereinafter, an embodiment of an imaging mass spectrometer and a mass spectrometry data analysis method according to the present invention will be described with reference to the accompanying drawings.

Figure 1:
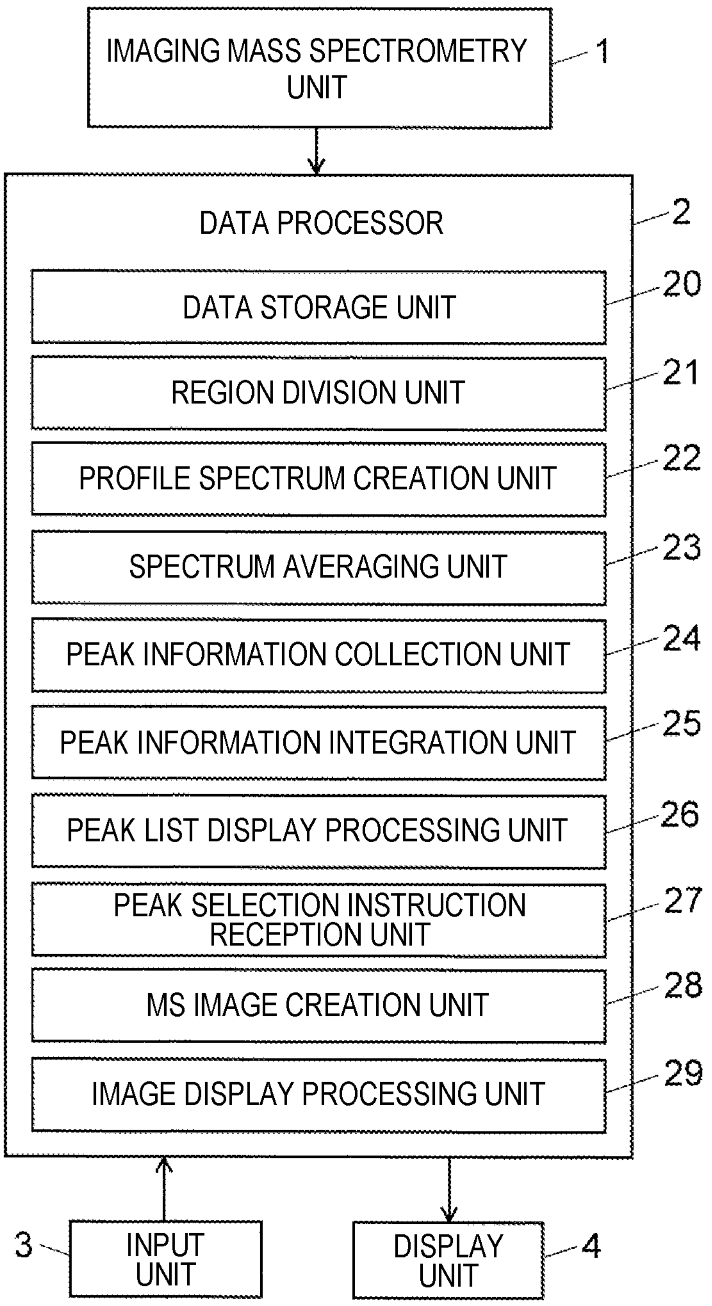
FIG. 1 is a schematic block configuration diagram illustrating an imaging mass spectrometer according to an embodiment of the present invention.

FIG. 1 is a schematic block configuration diagram of an imaging mass spectrometer of the present embodiment.

The imaging mass spectrometer of the present embodiment includes an imaging mass spectrometry unit 1, a data processor 2, an input unit 3, and a display unit 4.

The imaging mass spectrometry unit 1 is a measurement unit, for example, an air pressure MALDI ion trap time-of-flight mass spectrometer (APMALDI-IT-TOFMS). However, the imaging mass spectrometry unit 1 may be a device obtained by combining a laser microdissection device and a mass spectrometer which performs mass spectrometry of a sample prepared from a minute sample piece collected from a sample by the laser microdissection device as disclosed in Patent Literature 2.

The data processor 2 mainly has a function of processing a large amount of data obtained by the imaging mass spectrometry unit 1, and includes, as functional blocks, a data storage unit 20, a region division unit 21, a profile spectrum creation unit 22, a spectrum averaging unit 23, a peak information collection unit 24, a peak information integration unit 25, a peak list display processing unit 26, a peak selection instruction reception unit 27, an MS image creation unit 28, an image display processing unit 29, and the like.

In the imaging mass spectrometer of the present embodiment, the data processor 2 usually mainly includes a personal computer or a higher-performance workstation. The data processor 2 can embody the functional blocks by executing, on the computer, a dedicated data processing software (computer program) application installed in the computer. In this case, the input unit 3 is a keyboard or a pointing device (such as a mouse) attached to the computer, and the display unit 4 is a display monitor.

The above-described computer program can be provided to a user by being stored in a non-transitory computer-readable recording medium such as a CD-ROM, a DVD-ROM, a memory card, or a USB memory (dongle). In addition, the program can be provided to the user in the form of data transfer via a communication line such as the Internet. Furthermore, the program can be pre-installed in a computer which is a part of the system (strictly, a storage device which is a part of the computer) when the user purchases the system.

An example of a data analysis process in the imaging mass spectrometer of the present embodiment will be described with reference to FIGS. 2 to 4.

Figure 2:
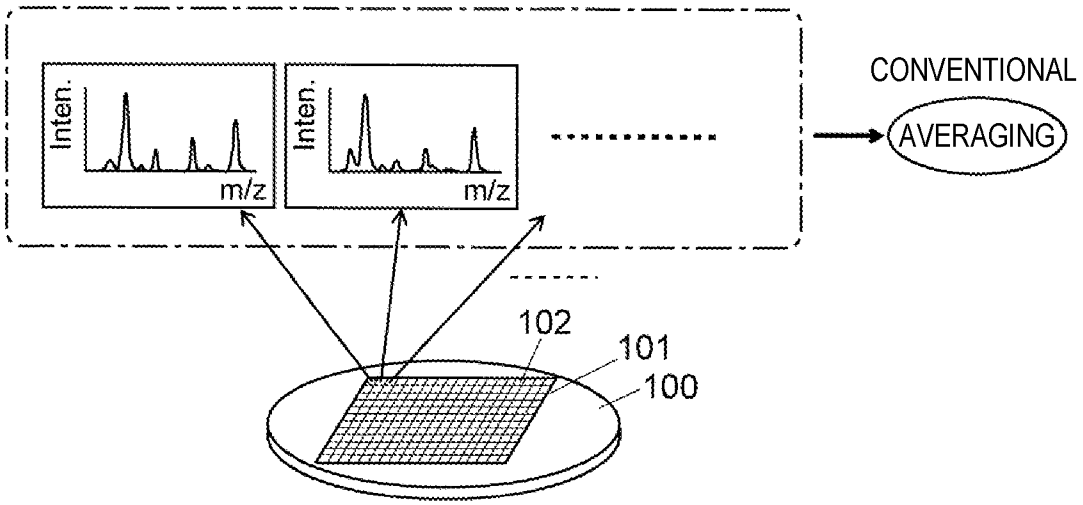
FIG. 2 is an explanatory diagram of a measurement state on a sample in the imaging mass spectrometer according to the present embodiment.

FIG. 2 is an explanatory diagram of a measurement state by the imaging mass spectrometry unit 1. FIG. 3 is a diagram showing an example of a distribution status of a compound in a measurement region on a sample. FIG. 4 is an explanatory diagram of an example of data analysis processing in the imaging mass spectrometer according to the present embodiment.

An object to be measured by the imaging mass spectrometry unit 1 is, for example, a slice sample obtained by thinly slicing a biological tissue such as a brain or an internal organ of a laboratory animal. Such a sample is placed on a sample plate. A matrix for MALDI is applied to a surface of the sample. The sample is set at a predetermined position of the imaging mass spectrometry unit 1.

As illustrated in FIG. 2, the imaging mass spectrometry unit 1 executes mass spectrometry on each of the micro region 102 obtained by finely segmenting a predetermined measurement region 101 set on a sample 100 in a grid pattern, and acquires mass spectrum data over a predetermined m/z range. The position, size, shape, and the like of the measurement region 101 can typically be appropriately determined by the user through optical microscopic observation or the like.

Specific analysis operation is as follows. An ion source in the imaging mass spectrometry unit 1 irradiates one micro region 102 with a laser beam for a short time to generate ions derived from compounds present in the micro region 102. The generated ions are temporarily introduced into an ion trap, then sent into a time-of-flight mass separator, separated according to the m/z value, and detected. This detection signal is mass spectrum data corresponding to one micro region 102. As illustrated in FIG. 2, the mass spectrum data is data (profile spectrum data) indicating a continuous waveform on the m/z axis. By repeating the similar analysis operation while moving the sample 100 or the ion source so that an irradiation position with the laser beam moves on the sample 100, the mass spectrum data can be collected for all the micro regions 102 set in the measurement region 101.

For each micro region 102, product ion spectrum data may be acquired by performing MS/MS analysis in which ions having a specific m/z value or included in a specific m/z range are analyzed by being dissociated by collision-induced dissociation or the like, or $MS^n$ analysis in which n is 3 or more, instead of the normal mass spectrometry.

The collection of mass spectrum data in the micro region 102 collected as described above, that is, MS imaging data for the entire measurement region 101 is transferred from the imaging mass spectrometry unit 1 to the data processor 2 and temporarily stored in the data storage unit 20. The data at this time is raw data obtained by mass spectrometry, but data obtained by performing appropriate waveform processing such as predetermined noise removal on the raw data may be stored in the data storage unit 20.

When the user instructs analysis execution from the input unit 3 in a state where the MS imaging data of the entire measurement region 101 is stored in the data storage unit 20 as described above, the data processor 2 executes the following processing.

Figure 4:
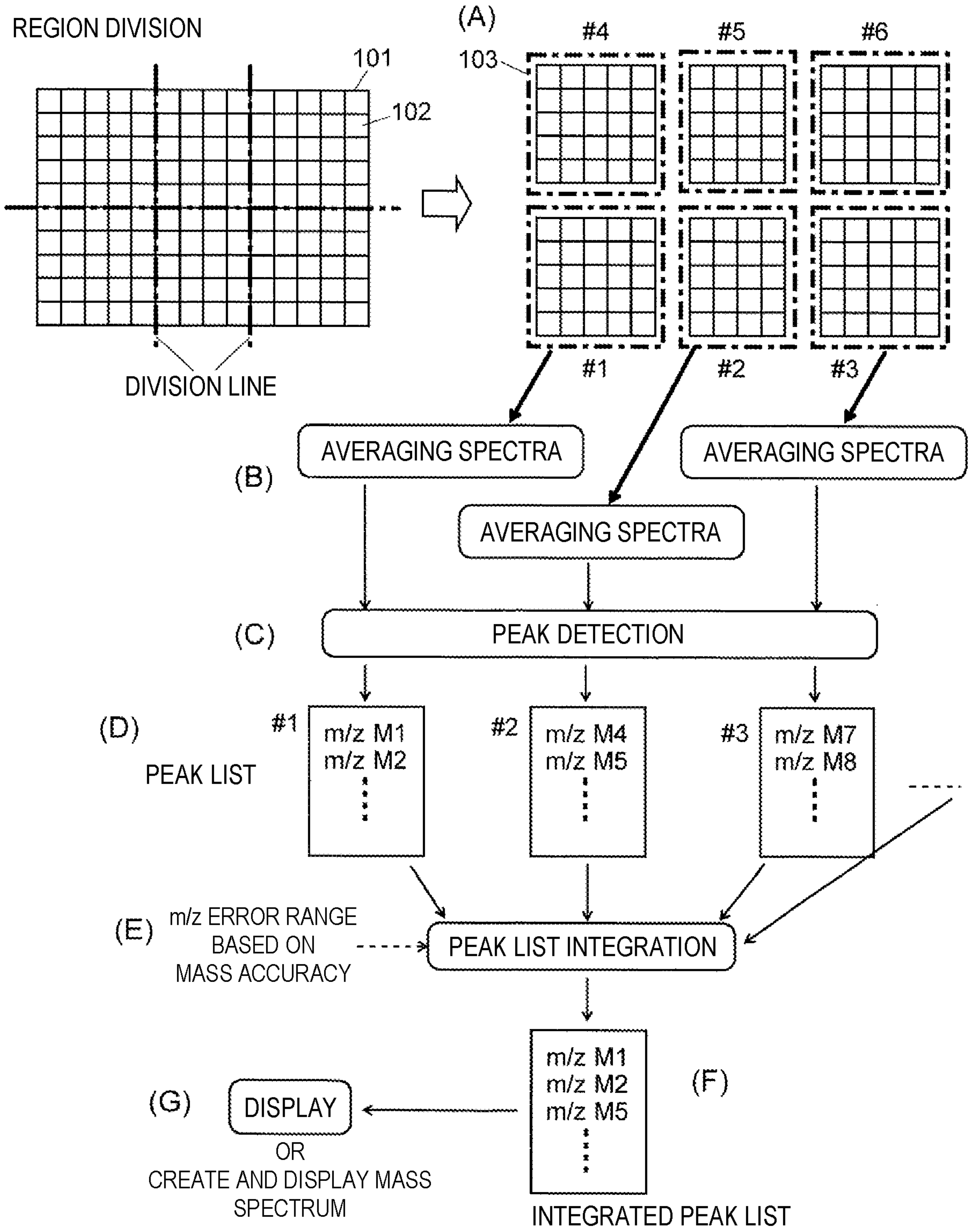
FIG. 4 is an explanatory diagram of an example of data analysis processing in the imaging mass spectrometer of the present embodiment.

First, in the data processor 2, the region division unit 21 performs a process of virtually dividing one measurement region 101 into a plurality of analysis regions 103 as illustrated in (A) of FIG. 4. In the example of (A) of FIG. 4, the measurement region 101 having a rectangular shape is divided into six, but the number of divisions is not limited to six. In addition, the division line does not need to be a straight line. In addition, the areas of the analysis regions 103 after the division are not necessarily the same, but in general, it is better not to make the difference in the areas extremely large, and one analysis region 103 includes a plurality of micro regions 102. In the example of FIG. 4, in order to distinguish the six analysis regions 103, the analysis regions 103 are denoted by reference numerals #1, #2, #3, #4, #5, and #6.

Then, the profile spectrum creation unit 22 sequentially reads data corresponding to all the micro regions 102 included in the analysis region 103 from the data storage unit 20 for each analysis region 103, and creates profile spectra corresponding to the respective micro regions 102. As illustrated in FIG. 2, the profile spectrum has a continuous waveform in the m/z-axis direction, and the compound present in the micro region 102 is observed as a mountain-like peak.

In the conventional imaging mass spectrometer, one average mass spectrum is calculated for the measurement region 101 by averaging all the profile spectra obtained in all the micro regions 102 in the measurement region 101. In contrast, in the imaging mass spectrometer of the present embodiment, the spectrum averaging unit 23 executes, for each analysis region 103, a process of averaging profile spectra in all the micro regions 102 included in one analysis region 103 (refer to (B) of FIG. 4). Therefore, six average mass spectra, which are the same as the number of analysis regions 103 in this example, are obtained.

Figure 3:
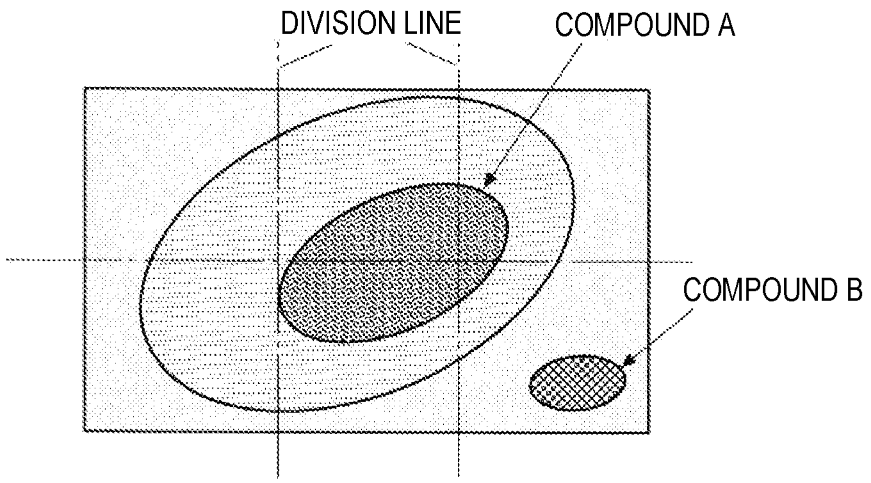
FIG. 3 is a diagram showing an example of a distribution status of a compound in a measurement region on a sample.

In the example shown in FIG. 3, a relatively high concentration of a compound A is present in a relatively wide range in the measurement region 101, while a relatively low concentration of a compound B is locally present in a part of the measurement region 101. In such a case, if the profile spectra in all the micro regions included in the measurement region 101 are averaged, the signal intensity of the peak corresponding to the compound B is considerably lower than the signal intensity of the peak corresponding to the compound A, and if the m/z values of both are close, the peak corresponding to the compound B may be buried at the skirt of the peak corresponding to the compound A.

In contrast, as indicated by an alternate long and short dash line in FIG. 3, when the measurement region 101 is divided into a plurality of analysis regions 103, and the profile spectra of the micro regions 102 included in each of the analysis regions 103 are averaged, in the average spectra obtained in a part of the analysis regions 103, there is a high possibility that the peak corresponding to the compound B can be observed without being buried in the peak of the compound A.

The peak information collection unit 24 detects a peak in the average mass spectrum for each analysis region 103 according to a predetermined standard (refer to (C) of FIG. 4). Then, for each analysis region 103, information on detected peaks is collected to create a peak list (refer to (D) of FIG. 4). The peak information includes at least the m/z value of the peak, and may include the intensity of the peak. As described above, a peak derived from the compound B locally included in a part of the measurement region 101 is also observed in the average mass spectrum of a part of the analysis region 103, and thus the peak list corresponding to the analysis region 103 can also include peak information of the compound B.

Then, the peak information integration unit 25 collects peak lists of all the analysis regions 103 and integrates the peak information (refer to (E) of FIG. 4). Specifically, for example, the m/z values of the peaks listed in all the peak lists are arranged in ascending order, and when the difference between the m/z values of two or more adjacent peaks is within an m/z error determined according to the mass accuracy of the device used for the measurement, the peaks are integrated by regarding the peaks as peaks derived from the same compound. When a plurality of peaks having significantly close m/z values are integrated, the m/z value of any one of the plurality of peaks before integration may be used as the m/z value of the peak after integration, or the m/z value obtained by predetermined calculation from the m/z values of the plurality of peaks before integration may be used as the m/z value of the peak after integration.

The peak information integration unit 25 integrates all the peaks that can be integrated as described above to create an organized peak list for the entire measurement region 101 (refer to (F) of FIG. 4). As in the compound A shown in FIG. 3, peak information corresponding to a compound widely distributed in the measurement region 101 is doubly-posted on peak lists corresponding to the plurality of analysis regions 103. Although the peak information can slightly differ depending on the analysis region 103, the difference should be within the error range of the mass accuracy of the device, and thus, the peaks are integrated. On the other hand, as in the compound B shown in FIG. 3, the peak information corresponding to the compound locally distributed in the measurement region 101 is described only in the peak list corresponding to one analysis region 103, but this is also reflected in the integrated peak list.

The peak list display processing unit 26 displays the peak list for the entire measurement region 101 created as described above on the screen of the display unit 4. Alternatively, the peak list display processing unit 26 may create a mass spectrum (hereinafter, referred to as integrated mass spectrum) based on the peak list created as described above and display this integrated mass spectrum (refer to (G) of FIG. 4).

The user checks the displayed peak list or integrated mass spectrum on the screen, and instructs a desired peak, for example, on the peak list or integrated mass spectrum with the input unit 3 for selection. The peak selection instruction reception unit 27 recognizes the instructed peak and determines the m/z value associated with the peak.

The MS image creation unit 28 reads the signal intensity value for each micro region 102 corresponding to the determined m/z value from the data storage unit 20, and creates an MS image. The image display processing unit 29 displays the created MS image on the screen of the display unit 4. For example, the MS image is displayed in the same screen as the peak list or the integrated mass spectrum, and when the user changes the peak instructed on the peak list or the integrated mass spectrum, the displayed MS image can be quickly updated in response to the change of the instruction (change in the instructed m/z value).

As described above, in the imaging mass spectrometer of the present embodiment, it is possible to present, to the user, the peak list and/or the integrated mass spectrum in which information on ion peaks derived from various compounds existing entirely or locally in the measurement region 101 is reflected without omission. This enables the user to appropriately select the peak corresponding to a target compound on the integrated mass spectrum, and check the MS image showing a distribution of the compound with high accuracy.

In the imaging mass spectrometer of the above embodiment, the region division unit 21 automatically divides the measurement region 101 into a plurality of regions according to a predetermined rule, but the rule can be appropriately set by the user. In addition, instead of dividing the entire measurement region 101, for example, only a specific range designated by the user in the measurement region 101 may be divided to define a plurality of analysis regions, and the above-described processing may be performed on the plurality of analysis regions.

Figure 5:
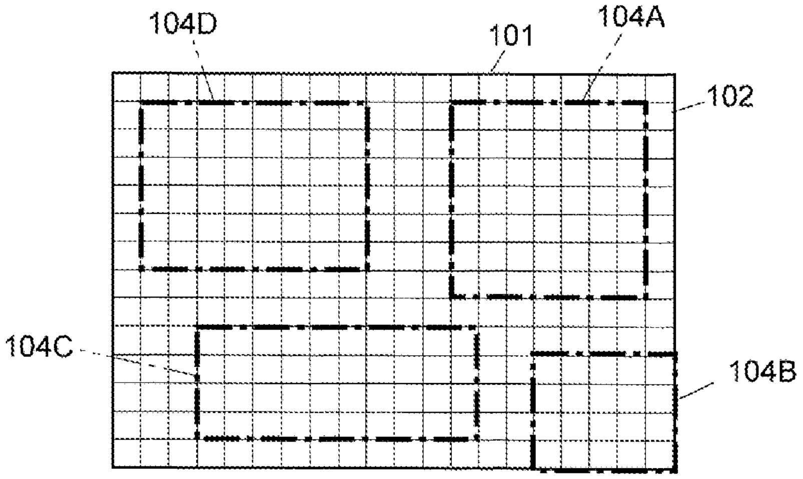
FIG. 5 is a diagram showing a modification when a plurality of analysis regions are set in a measurement region in the imaging mass spectrometer of the present embodiment.

Furthermore, the user may be enabled to manually designate a plurality of analysis regions in the measurement region 101. FIG. 5 is a diagram illustrating a modification when a plurality of analysis regions are set in the measurement region 101 by manual operation.

For example, the region division unit 21 displays the optical microscopic image of the entire measurement region 101, and receives designation of a plurality of analysis regions by the user on the display screen. In the example of FIG. 5, four analysis regions 104A to 104D are designated. Herein, the shape of each analysis region is rectangular, but is not limited to rectangular. The size, position, and number of analysis regions are also optional. The designated analysis regions 104A to 104D can be handled as they are in the same manner as the analysis region after being automatically divided, and the processing can proceed. By enabling the setting of the analysis region by such manual operation, for example, a specific part (biological tissue, lesion site, or the like) that can be observed in an optical microscopic image can be processed as one analysis region, and it is useful for grasping a compound that is typically easily overlooked.

In the imaging mass spectrometer of the embodiment described above, the imaging mass spectrometry unit 1 uses the time-of-flight mass separator as a mass separator. However, the imaging mass spectrometry unit 1 is not limited to the time-of-flight mass separator, and may use a mass separator having a mass resolution equal to or higher than that of the time-of-flight mass separator. Specifically, in addition to various time-of-flight mass spectrometers, a Fourier transform mass spectrometer using a Fourier transform ion cyclotron resonance mass separator, an Orbitrap mass separator, or the like is useful. In addition, the ion source in the imaging mass spectrometry unit 1 is not limited to the air pressure MALDI ion source, and an ion source by an optional ionization method can be used.

In addition, instead of performing mass spectrometry while sequentially scanning the micro regions 102 set in the measurement region 101 on the sample 100, the imaging mass spectrometry unit 1 may perform stigmatic (or projection-type) imaging mass spectrometry for simultaneously performing mass spectrometry on a large number of micro regions in parallel. Furthermore, the imaging mass spectrometry unit 1 may physically cut out a minute sample piece from each of the micro regions 102 in the measurement region 101 by a method such as laser microdissection, and perform mass spectrometry on a liquid sample prepared from each sample piece to acquire data. That is, the measurement method may be any method as long as the mass spectrum data in a predetermined m/z range in each micro region 102 in the measurement region 101 can be obtained.

In addition, the embodiment and the modification described above are merely examples of the present invention, and it is a matter of course that modifications, corrections, additions, and the like appropriately made within the scope of the gist of the present invention are included in the claims of the present application.

[Various Modes]

A person skilled in the art can understand that the previously described illustrative embodiments are specific examples of the following modes of the present invention.

(Clause 1) One mode of a mass spectrometry data analysis method according to the present invention is a mass spectrometry data analysis method for analyzing data obtained by performing mass spectrometry for each of a plurality of micro regions in a measurement region on a sample, the mass spectrometry data analysis method including:

an analysis region determination step of determining a plurality of analysis regions each including a plurality of the micro regions by dividing the measurement region or in accordance with designation of a user for an inside of the measurement region;

a spectrum operation step of acquiring, in each of the plurality of analysis regions, an individual integrated mass spectrum by averaging or summing profile spectra for micro regions based on data obtained for a plurality of micro regions included in the analysis region;

a peak information integration step of detecting a peak on each of a plurality of the individual integrated mass spectra, collecting peak information including at least a mass-to-charge ratio value of the peak detected in each of the plurality of analysis regions, gathering peak information of the plurality of analysis regions, integrating peaks that can be estimated to have substantially the same mass-to-charge ratio value, and obtaining integrated peak information; and an information display step of creating and displaying a peak list or a mass spectrum based on the integrated peak information.

(Clause 4) One mode of an imaging mass spectrometer according to the present invention is an imaging mass spectrometer including:

a measurement unit configured to acquire data by performing mass spectrometry for each of a plurality of micro regions in a measurement region on a sample;

an analysis region determination unit configured to determine a plurality of analysis regions each including a plurality of the micro regions by dividing the measurement region or in accordance with designation of a user for an inside of the measurement region;

a spectrum operation unit configured to acquire, in each of the plurality of analysis regions, an individual integrated mass spectrum by averaging or summing profile spectra based on data obtained by the measurement unit for a plurality of micro regions included in the analysis region;

a peak information integration unit configured to detect a peak on each of a plurality of the individual integrated mass spectra, to collect peak information including at least a mass-to-charge ratio value of the peak detected in each of the plurality of analysis regions, to gather peak information of the plurality of analysis regions, to integrate peaks that can be estimated to have substantially the same mass-to-charge ratio value, and to obtain integrated peak information; and a display processing unit configured to create a peak list or a mass spectrum based on the integrated peak information and display it on a display unit.

In the mass spectrometry data analysis method according to clause 1 and the imaging mass spectrometer according to clause 4, the profile spectrum is averaged or summed not for the entire measurement region where the data is collected but for each analysis region having an area smaller than the entire measurement region, and the integrated peak information is obtained based on the result. Therefore, it is possible to prevent a peak derived from a compound locally present in a relatively small amount in the measurement region from being buried in the skirt of another peak having a close m/z value and high intensity, and it is possible to provide a peak list or a mass spectrum accurately reflecting such a peak to the user. Therefore, according to the above modes of the present invention, the user can accurately analyze the target compound without overlooking the presence of the compound that is locally present in a small amount in a narrow area of the measurement region.

In addition, with the mass spectrometry data analysis method described in clause 1 and the imaging mass spectrometer described in clause 4, it is possible to display a mass spectrum in which peaks having m/z values highly accurately corresponding to masses of a plurality of compounds present in the measurement region are observed while utilizing high mass accuracy of a mass spectrometer used for measurement. Thereby, the user can observe an MS image with high accuracy corresponding to each of the plurality of compounds, and can perform distribution analysis of the compound with finer and higher accuracy than before.

(Clause 2) The mass spectrometry data analysis method according to clause 1 may further include:

a peak selection acceptance step of accepting an instruction to select a peak by the user on the peak list or the mass spectrum displayed in the information display step; and an image creation step of creating a mass spectrometry image corresponding to the instructed peak.

In the peak list or the mass spectrum displayed by the display step in the mass spectrometry data analysis method described in clause 1, a peak with high accuracy corresponding to each of a plurality of compounds present in the measurement region or m/z value information of the peak is obtained. With the mass spectrometry data analysis method described in clause 2, the user can display the MS image by designating a specific peak based on the peak list or the mass spectrum, and thus it is possible to display the MS image reflecting the distribution of a target compound with high accuracy. In addition, the user can observe the distribution of the compound by the MS image without overlooking the compound locally present in a slight amount in the measurement region.

(Clause 3) In the mass spectrometry data analysis method according to clause 1 or 2, the peak information integration step may perform a process of determining whether mass-to-charge ratio values of a plurality of peaks are substantially the same according to a standard corresponding to mass accuracy of a device used for mass spectrometry.

In the mass spectrometry data analysis method according to clause 3, information on peaks derived from a plurality of different compounds having m/z values significantly close to each other can be appropriately provided to the user as different peaks by sufficiently utilizing the high mass accuracy of the device. In addition, peaks estimated to be derived from the same compound although having different m/z values can be integrated and provided to the user as information of one peak, and unnecessary and redundant information can be avoided from being provided to the user.

REFERENCE SIGNS LIST

1 . . . Imaging Mass Spectrometry Section
2 . . . Data Processor
20 . . . Data Storage Unit
21 . . . Region Division Unit
22 . . . Profile Spectrum Creation Unit
23 . . . Spectrum Averaging Unit
24 . . . Peak Information Collection Unit
25 . . . Peak Information Integration Unit
26 . . . Peak List Display Processing Unit
27 . . . Peak Selection Instruction Reception Unit
28 . . . MS Image Creation Unit
29 . . . Image Display Processing Unit
3 . . . Input Unit
4 . . . Display Unit

The invention claimed is:

1. A mass spectrometry data analysis method for analyzing data obtained by performing mass spectrometry for each of a plurality of micro regions in a measurement region on a sample, the mass spectrometry data analysis method comprising:

a data acquisition step of physically scanning the sample using an ion source and a mass separator to acquire the data by performing mass spectrometry for each of the plurality of micro regions;

an analysis region determination step of determining a plurality of analysis regions each including a plurality of the micro regions by dividing the measurement region or in accordance with designation of a user for an inside of the measurement region;

a spectrum operation step of acquiring, in each of the plurality of analysis regions, an individual integrated mass spectrum by averaging or summing profile spectra for micro regions based on data obtained for a plurality of micro regions included in the analysis region;

a peak information integration step of detecting a peak on each of a plurality of the individual integrated mass spectra, collecting peak information including at least a mass-to-charge ratio value of the peak detected in each of the plurality of analysis regions, gathering peak information of the plurality of analysis regions, integrating peaks that can be estimated to have substantially a same mass-to-charge ratio value, and obtaining integrated peak information; and an information display step of creating and displaying a peak list or a mass spectrum based on the integrated peak information.

2. The mass spectrometry data analysis method according to claim 1, further comprising:

a peak selection acceptance step of accepting an instruction to select a peak by the user on the peak list or the mass spectrum displayed in the information display step; and an image creation step of creating a mass spectrometry image corresponding to the instructed peak.

3. The mass spectrometry data analysis method according to claim 1, wherein the peak information integration step performs a process of determining whether mass-to-charge ratio values of a plurality of peaks are substantially a same according to a standard corresponding to mass accuracy of a device used for mass spectrometry.

4. An imaging mass spectrometer comprising:

a measurement unit configured to physically scan a sample using an ion source and a mass separator to acquire data by performing mass spectrometry for each of a plurality of micro regions in a measurement region on the sample;

an analysis region determination unit configured to determine a plurality of analysis regions each including a plurality of the micro regions by dividing the measurement region or in accordance with designation of a user for an inside of the measurement region;

a spectrum operation unit configured to acquire, in each of the plurality of analysis regions, an individual integrated mass spectrum by averaging or summing profile spectra based on data obtained by the measurement unit for a plurality of micro regions included in the analysis region;

a peak information integration unit configured to detect a peak on each of a plurality of the individual integrated mass spectra, to collect peak information including at least a mass-to-charge ratio value of the peak detected in each of the plurality of analysis regions, to gather peak information of the plurality of analysis regions, to integrate peaks that can be estimated to have substantially a same mass-to-charge ratio value, and to obtain integrated peak information; and a display processing unit configured to create a peak list or a mass spectrum based on the integrated peak information and display it on a display unit.

* * * * *